United States Patent
Stoner et al.

(10) Patent No.: US 7,482,950 B2
(45) Date of Patent: Jan. 27, 2009

(54) METHOD AND APPARATUS FOR HANDLING DATA AND AIRCRAFT EMPLOYING SAME

(75) Inventors: Paul Douglas Stoner, Powell, OH (US); Ovidiu Gabriel Vlad, Naperville, IL (US)

(73) Assignee: Embedded Control Systems, Lisle, IL (US)

( * ) Notice: Subject to any disclaimer, the term of this patent is extended or adjusted under 35 U.S.C. 154(b) by 341 days.

(21) Appl. No.: 11/464,321

(22) Filed: Aug. 14, 2006

(65) Prior Publication Data
US 2008/0042879 A1     Feb. 21, 2008

(51) Int. Cl.
G08B 21/00 (2006.01)
H04N 7/18 (2006.01)
G09G 1/02 (2006.01)

(52) U.S. Cl. .................. 340/945; 340/963; 340/971; 340/973; 340/691.2; 340/691.6; 348/123; 345/28

(58) Field of Classification Search .............. 340/945, 340/691.6, 963, 967, 438, 459, 461, 462, 340/971, 973, 974, 977, 978, 979, 691.1, 340/691.2, 691.4, 691.5; 348/115, 117, 121, 348/123; 345/10, 11, 24, 27, 28; 701/3, 701/4, 9, 14, 15, 16
See application file for complete search history.

(56) References Cited

U.S. PATENT DOCUMENTS

| 4,713,762 | A | * | 12/1987 | Igarashi | 701/1 |
| 4,875,041 | A | * | 10/1989 | Dannenberg | 340/870.13 |
| 5,432,497 | A | * | 7/1995 | Briski et al. | 340/525 |
| 5,783,993 | A | * | 7/1998 | Briski et al. | 340/525 |
| 5,949,330 | A | * | 9/1999 | Hoffman et al. | 340/438 |

* cited by examiner

Primary Examiner—Toan N Pham
(74) Attorney, Agent, or Firm—Fitch, Even, Tabin & Flannery

(57) ABSTRACT

These teachings present triple data transport redundancy in the form of three data bus interfaces that are each designed and manufactured independently from one another and compatible with a common data handling protocol. This protocol can be one that includes no error correction. These interfaces can each couple to a corresponding first, second, and third data bus that may comprise optical data busses. Information gauges can be realized through use a memory that stores a plurality of images comprising views of an information gauge (or gauges) of interest showing a variety of different readings. Upon receiving information regarding a monitored parameter of interest (via, for example, the aforementioned data busses and data bus interfaces), this information can be used to address the stored information gauge view that corresponds to the present parameter value. That particular view can be recalled and displayed to thereby provide the corresponding information to a viewer.

28 Claims, 8 Drawing Sheets

METHOD AND APPARATUS FOR HANDLING DATA AND AIRCRAFT EMPLOYING SAME

TECHNICAL FIELD

This invention relates generally to data handling.

BACKGROUND

Data-based components, platforms, methods, and techniques are ubiquitous in modern technology. A vast array of devices of various kinds and categories source, receive, transport, and/or otherwise rely, one way or the other, upon data. Such data may, for example, comprise status information, command and control information, or user/application content. Numerous data handling protocols exist to facilitate the movement of such data including any number of signaling protocols.

Aircraft comprise a particularly challenging example in this regard. Modern aircraft include a large number of data producing and data using components. In many cases the information in question is important or even critical to the proper and safe operation of the aircraft. As a result, a number of practices are observed to ensure the operational integrity of the aircraft notwithstanding potential problems that might from time to time arise.

As one example, aircraft typically employ a redundant data bus architecture. Important data travels from one point to another via each of a first and a second data bus. During operation, the data carried by a first one of these data busses will be used to the exclusion of the data carried by the remaining bus unless and until that first data bus exhibits sufficiently degraded or failed operability. To protect the data (at least to some extent) and also to facilitate the detection of such degradation/failure, relatively elaborate and intense error correction/detection data handling protocols are employed in conjunction with these data busses.

Though an acceptable safe data handling architecture can be achieved using this approach, the challenges and costs are relatively high. The copper alone that comprises these data busses can weigh a good deal and the connectors that are typically employed to couple the data handling components also contribute significantly in this regard. This weight, in turn, reduces the passenger/cargo-handling capacity of the aircraft, often by considerable amounts.

Another challenge and set of costs corresponds to the development of the software that facilitates the protected nature of the data handling protocol. Very high standards are applied with respect to the predictability and reliability of software intended for use in the data handling functionality of a modern aircraft. This, in turn, typically translates into very high development and testing costs for such software. Some estimates indicate that every single line of fielded code for a modern airplane costs in the neighborhood of one hundred and sixty dollars (leading to an aggregate cost, in some cases, of more than eighty million dollars).

Such costs arise, of course, because software seems necessary at every turn in a modern aircraft. Not only is considerable software dedicated as noted to ensuring the reliable transport of data from one component to another, considerable additional software finds application in the cockpit. That a typical aircraft cockpit displays a large and densely packed number of information gauges is axiomatic. As aircraft manufacturers strive to move away from mechanical information gauges for any number of good and valid reasons, the replacement of such mechanical systems with modern electronic displays has brought with it a corresponding voracious appetite for yet more software to translate incoming data into displayable content.

An interesting point exists in this regard that itself speaks volumes regarding the difficulties of achieving and maintaining desired levels of reliability using the aforementioned approaches. Notwithstanding the use of redundant data busses as noted, and notwithstanding all of the advances made over the years with respect to the power and reliability of error correction and error detection-capable data handling protocols, the Federal Aviation Administration of the United States still requires that an aircraft having an otherwise non-mechanical set of information gauges must still nevertheless also have a mechanical gauge for each of airspeed information, altimeter information, and attitude information. As such mechanical information gauges are provided for both the pilot and co-pilot position, the total weight often attributed to such systems is often in the neighborhood of eighty pounds; this is weight-carrying capacity that every aircraft designer and operator would like to see returned. Present solutions, however, are simply not reliable enough to warrant the removal of such mechanical information gauges from the design of a modern aircraft.

BRIEF DESCRIPTION OF THE DRAWINGS

The above needs are at least partially met through provision of the method and apparatus for handling data and aircraft employing same described in the following detailed description, particularly when studied in conjunction with the drawings, wherein.

Figure 1:
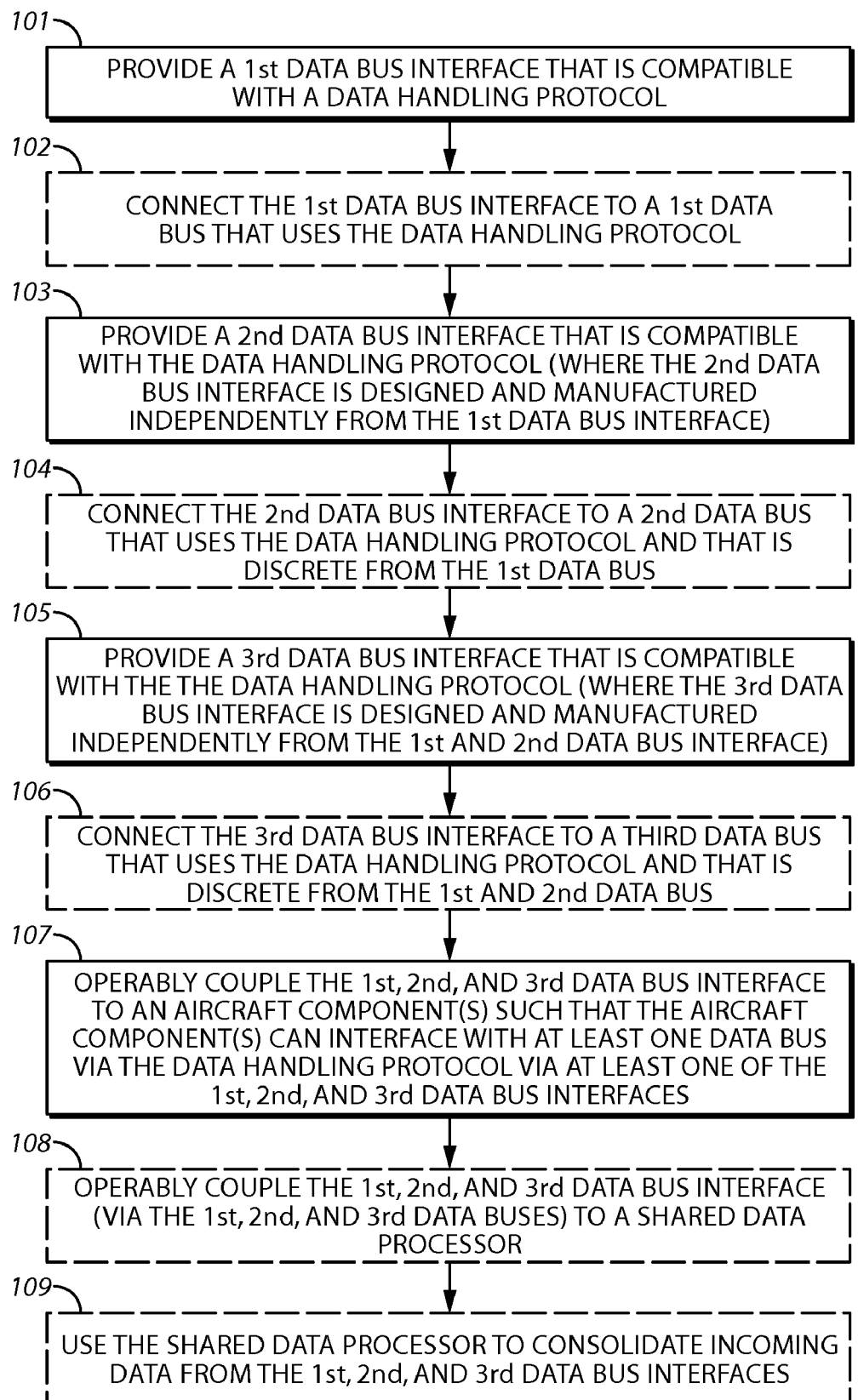
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, various approaches are employed to improve the reliability of data transport and reception and/or to reduce the usage of software and/or weighty copper. By one approach, these approaches can include triple data transport redundancy in the form of a first, second, and third data bus interface that are each compatible for use with a common data handling protocol and where each data bus interface is designed and manufactured independently from one another. If desired, this aforementioned data handling protocol can be configured and arranged to make no provision for error correction (including error detection). By one approach, these interfaces can couple, in turn, to a corresponding first, second, and third data bus. These data busses can comprise optical data busses if desired.

As yet another illustrative approach in these regards, information gauges can be realized through use of one or more memories that store a plurality of images that comprise views of the information gauge (or gauges) of interest showing a variety of different readings. Upon receiving information regarding a monitored parameter of interest (via, for example, the aforementioned data busses and data bus interfaces), this information can be used to address the stored information gauge view that corresponds to the present value of the monitored parameter. That particular information gauge view can then be recalled and displayed to thereby provide the corresponding information to a viewer.

When employed as part of an aircraft's informational transport and usage architecture, these approaches can lead to a significant reduction in weight (and volume) while also leading to improved reliability. Perhaps of at least similar importance, these important benefits seem achievable at a considerably lesser cost than is ordinarily associated with today's solutions.

These and other benefits may become clearer upon making a thorough review and study of the following detailed description. Referring now to the drawings, and in particular to FIG. 1, by one approach, these teachings incorporate the provision 101 of a first data bus interface that is compatible with a given data handling protocol. This first data bus interface can comprise, if desired, an optical data bus interface and, more particularly, a polymer optical data bus interface that is suitable for use in conjunction with polymer optical fiber-based data busses. If desired, this first data bus interface can comprise a full-duplex optical data bus interface. By one approach, the data bus itself will comprise a ring-configured data bus. In such a case, this first data bus interface can comprise a ring interface. If desired, this first data bus interface can be configured and arranged to transmit substantially similar data (including identical data) in opposing directions of such a ring-configured data bus substantially simultaneously.

The aforementioned data handling protocol can comprise, if desired, a simple data handling protocol. Any of a wide variety of modulation techniques as are presently known (or that will likely be developed hereafter) can be employed in this regard as these teachings are not overly sensitive to specific selections amongst such options. By one approach, the data handling protocol can essentially comprise a direct one-for-one representation of the information to be conveyed with little or no error correction. (As used herein, those skilled in the art will understand and recognize that "error correction" serves as a reference to protocol-based error mitigation, error detection, and error correction, which concepts are well understood in the art and require no further elaboration here.)

These teachings will then further optionally accommodate connecting 102 this first data bus interface to a first data bus (such as an optical data bus as will be described in greater detail further below) that uses the aforementioned data handling protocol.

In this illustrative example, this process next provides for provision 103 of a second data bus interface that is also compatible with this same data handling protocol. In this case, however, this second data bus interface is designed and manufactured independently from the first data bus interface described above. There are various ways to achieve this result. By one approach, two different design teams are each provided with a common set of design requirements. These design requirements can provide necessary specifications regarding such things as the data handling protocol itself, the physical nature and parameters of the data bus to which these data bus interfaces will connect, form factor requirements regarding, for example, size and weight limitations, performance requirements, environmental requirements, specifications regarding quality, mean time to failure, and so forth, cost requirements, manufacturability requirements and materials limitations, and so forth. If desired, such design requirements can also stipulate, or prohibit, the use of specific components, specific manufacturers of components, sub-assemblies, and/or final assemblies, specific manufacturing processes, and so forth.

So approached, the first and second data bus interface are highly unlikely to share and/or experience a common mode failure. That is, both interfaces are unlikely to both fail at the same time in response to a same set of conditions aside from physically catastrophic events that might simultaneously occur to both interfaces (such as a nearby explosion of serious proportions or the like). For example, though one interface might conceivable fail due to some unique environmental circumstance, some unexpected data event, or some accumulated condition over time, the remaining interface is unlikely to also fail, at the same time, in response to these same conditions. At least one significant benefit of this approach will be made clearer below.

As with the first data bus interface, this process will optionally accommodate connecting 104 this second data bus interface to a corresponding data bus. By one approach, this data bus can be discrete with respect to the aforementioned first data bus but will still preferably be compatible with the data handling protocol mentioned above.

These same steps are then essentially repeated through provision 105 of a third data bus interface that is again compatible with this data handling protocol but that is itself designed and manufactured independently of both the first and second data bus interfaces followed, optionally, by connection 106 of this third data bus interface to a corresponding data bus that employs the above-described data handling protocol. And again, if desired, this data bus to which the third data bus interface connects can itself be discrete with respect to the previously mentioned data busses.

If desired, yet further data bus interfaces can be provided to further supplement the first, second, and third data bus interfaces noted above. For most purposes, however, there seems little practical value to providing additional interfaces in this regard. As used herein, these three independently designed and manufactured data bus interfaces appear sufficient to provide an extremely high level of operational reliability.

Figure 2:
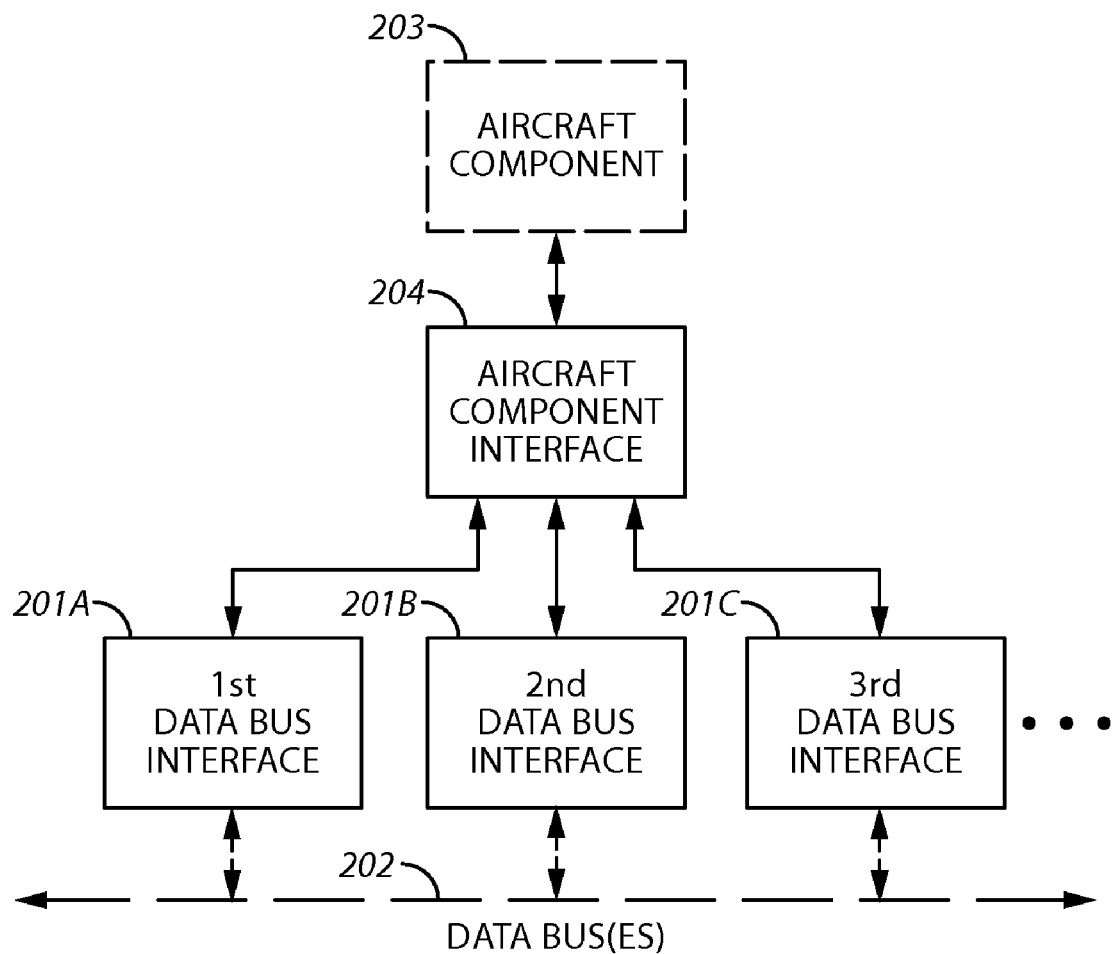
FIG. 2 comprises a block diagram as configured in accordance with various embodiments of the invention.

This process then provides for operably coupling 107 the first, second, and third data bus interface to at least one aircraft component such that this at least one aircraft component can interface with at least one data bus via the data handling protocol using at least one (and, more typically, all) of the first, second, and third data bus interfaces. Referring momentarily to FIG. 2, a corresponding aircraft data bus interface can be seen to comprise a first, second, and third data bus interface 201A-201C that each connect to a data bus 202 (or data busses as suggested above) and to an aircraft component interface 204. The latter, in turn, couples to a corresponding aircraft component 203.

There are no particular limitations with respect to the nature of the aircraft component 203 itself though this aircraft component 203 may be expect to essentially comprise, one way or the other, a data-based component. That is, the aircraft component 203 will typically source, relay, process, receive, store, and/or use information. Examples include, but are certainly not limited to, airspeed sensors, altitude sensors, beacon signal receivers, wireless transmitters, radar, fuel level sensors, engine operational parameters sensors of various kinds, informational displays, and so forth.

As shown, there can be a one-to-one connection between a given aircraft component 203 and its corresponding aircraft component interface 204. Other possibilities exist in this regard, however. For example, if desired, the aircraft component interface could itself couple to another data bus that comprises the backbone of a local area network shared by a plurality of aircraft components. These teachings are readily compatible with such alternative architectures.

So configured, those skilled in the art will understand and recognize that this aircraft component 203 has access to a data path to facilitate its data transmission and/or reception activities via any or all of the three data bus interfaces 201A-201C. As described above, these three data bus interfaces 201A-201C are each designed and manufactured independently from one another and are therefore highly unlikely to suffer a shared failure mode. As a result, it should be highly unlikely that such an aircraft component 203 will lose its access to the data bus (or busses) 202.

The availability of three data bus interfaces as described (and particularly when used in conjunction with three corresponding independent data busses) offers further opportunities for improved reliability when viewed from the standpoint of receiving data via that bus (or busses) 202. Referring again to FIG. 1, in such a case, these teachings will further optionally accommodate operably coupling 108 the first, second, and third data bus interfaces as well as the aircraft component to a shared data processor. So configured, such a shared data processor can then be optionally used 109 to consolidate incoming data from the first, second, and third data bus interfaces.

This can comprise, as but one example in this regard, substantially averaging the incoming data from these data bus interfaces to provide a resultant averaged data value(s) for presentation to the corresponding aircraft component. If desired, this can further comprise determining whether the incoming data from each of the first, second, and third data bus interfaces is within a predetermined range of one another. In a case where significantly outlying data exists, for example, this process will accommodate not using incoming data from the data bus interface that is associated with data that is not within this predetermined range. The extent of this range can vary with the needs, requirements, and/or opportunities as characterize a given application setting. For example, in one setting, a relatively small range (such as 1% of an average value) may be used while another setting might permit a relatively larger range (such as 5% of an average value).

Figure 3:
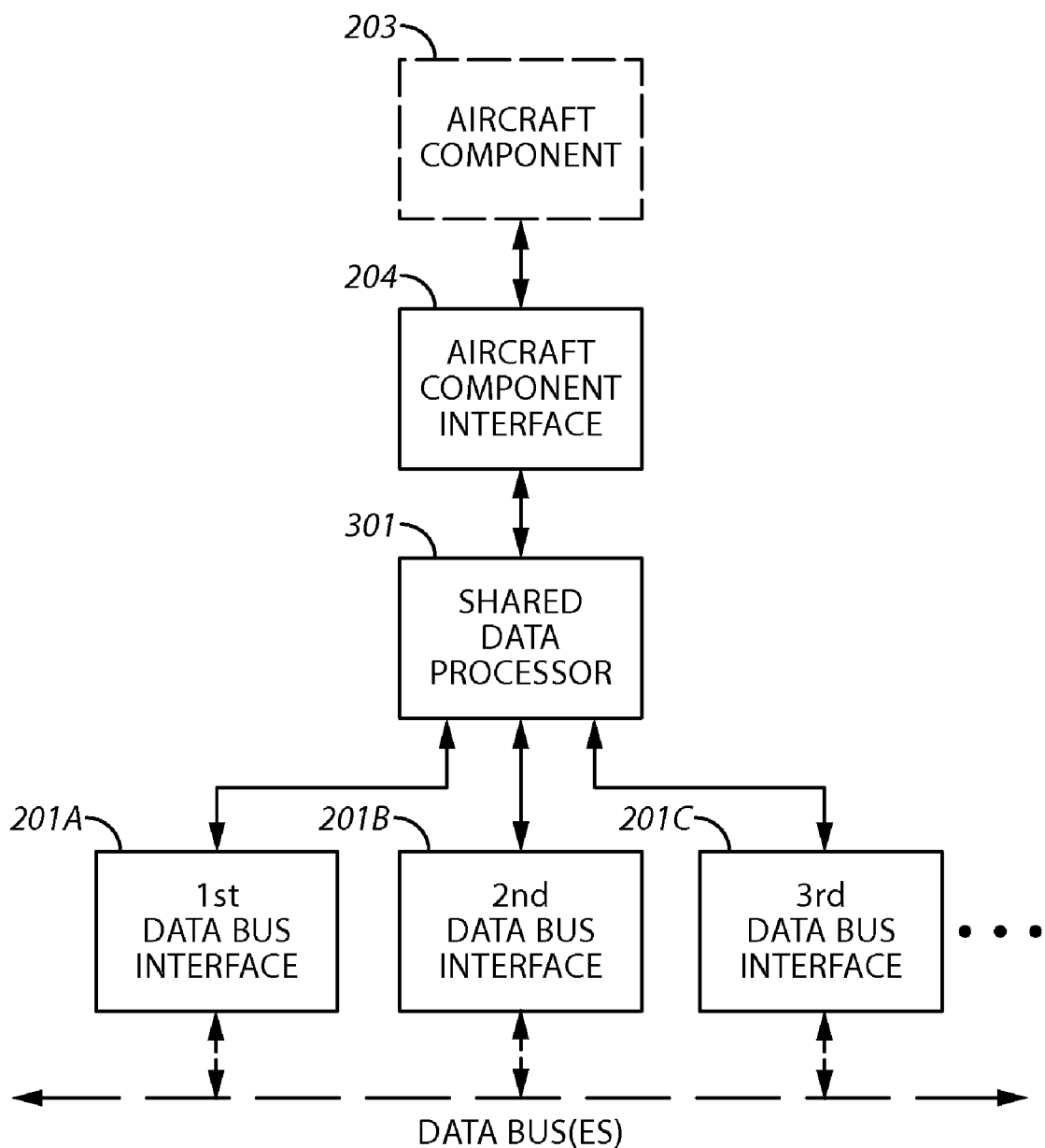
FIG. 3 comprises a block diagram as configured in accordance with various embodiments of the invention.

To illustrate, and referring now to FIG. 3, such a shared data processor 301 can be disposed between the aforementioned data bus interfaces 201A-201C and aircraft component interface 204. The shared data processor 301 can be comprised of a fully or partially programmable platform, such as a microprocessor, if desired. Preferably, however, the shared data process 301 (as well as the other elements and components referred to above) comprises a softwareless platform; that is, a component that operates with hard-embodied logic and/or in the absence of logic (when possible). Such approaches and platforms are known in the art. Examples presently include, but are not limited to, field programmable gate arrays, application specific integrated circuits, programmable logic devices, and so forth. As will be well understood by those skilled in the art, such platforms are readily configured to operate as described herein.

So configured, such a shared data processor 301 can greatly increase the likely accuracy of received data. Present approaches in this regard favor the use of a single incoming data stream unless and until that data stream exhibits clear signs of degradation. The shared data processor approach, however, permits three incoming data values for a given parameter to each be used when arriving at a composite conclusion regarding a value to be used for that given parameter. So long as those three data values are each within some acceptable range, that composite result (such as, for example, a simple average of the three proffered values) will often comprise a statistically more valid result than any one of those individual data values considered in isolation.

In the embodiments shown in each of FIGS. 2 and 3, the three avenues of data movement represented by the first, second, and third data bus interfaces 201A-201C are effectively multiplexed/demultiplexed in a manner that is transparent to the aircraft component 203. By the approach shown in FIG. 2, the aircraft component interface 204 serves this purpose while the approach shown in FIG. 3 employs the shared data processor 301 to this end. Such approaches are particularly useful when applied in conjunction with legacy aircraft components that have only a single input and/or output portal. The present teachings are also readily applied, however, in conjunction with an aircraft component that is more specifically designed to operate seamlessly with these teachings. In such a case, the aircraft component could be itself configured to effectively include the aforementioned aircraft component interface and/or the shared data processor. By this approach, the aircraft component would be capable of coupling to and using the three data bus interfaces in a more integrated fashion.

In the examples illustrated above, the data bus 202 has been shown as a single data bus. As is also noted above, however, each of the data bus interfaces 201A-201C can connect to a separate data bus. For example, and referring now to FIG. 4, each of the data bus interfaces 201A-201C can couple to an individually discrete data bus (represented here by a first optical data bus 202A, a second optical data bus 202B, and a third optical data bus 202C). In this particular illustrative embodiment, each such data bus comprises a full-duplex data bus. There are various ways to achieve such a result. By one approach, for example, different light frequencies can be employed as data bearing carriers in opposing directions of the optical pathway that comprises the data bus. By another approach, each such data bus can itself be comprised of two or more independent optical fibers. For example, a first optical fiber as comprises, say, the first optical data bus 202A can be used for data moving in a first direction and a second, different optical fiber as also comprises that first optical data bus 202A can be used for data that moves in an opposite direction.

As is also noted above and as is illustrated here, each of these data bus interfaces 201A-201C comprises a fully bi-directional interface. So configured, incoming data can enter the data bus interface and be accordingly processed from either side of the optical data bus. Similarly, outgoing data can exit the data bus interface and enter either and/or both sides of the optical data bus.

Figure 4:
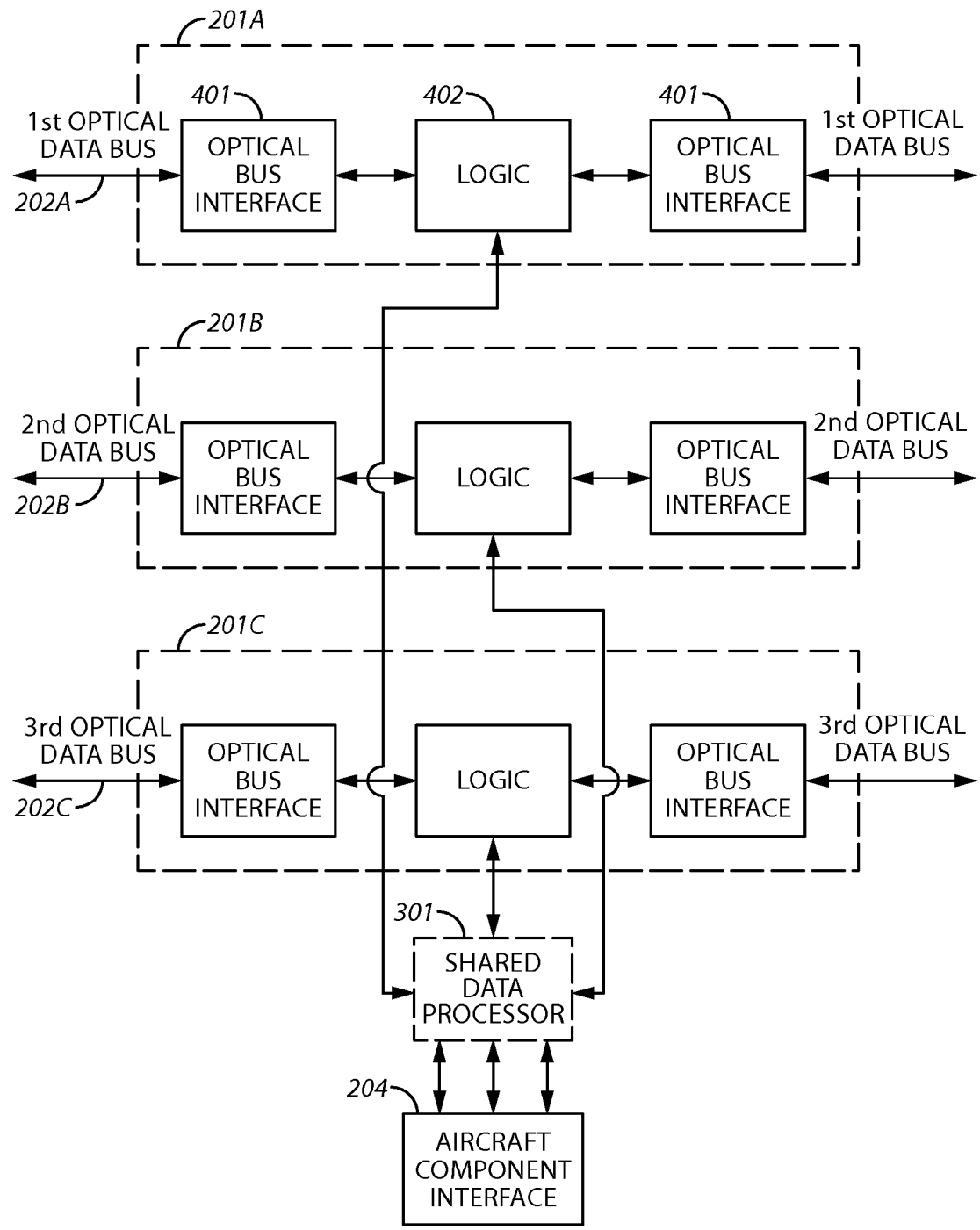
FIG. 4 comprises a block diagram as configured in accordance with various embodiments of the invention.

To facilitate such agility, and with continued reference to FIG. 4, each of the data bus interfaces (such as, for example, the first data bus interface 201A) can be comprised of two optical bus interfaces 401 that are configured and positioned to interface with both sides of the first optical data bus 202A. Each such data bus interface can also comprise, when appropriate, a logic component 402 that couples between these optical bus interfaces 401 and the aforementioned shared data processor 301 and/or aircraft component interface 204. Such logic can be configured and arranged to, for example, read and recognize destination addresses and/or source addresses, time stamps, and so forth as may accompany a given data transmission.

Such logic can also be configured to forward data intended for its particular aircraft component via the aircraft component interface 204 to that aircraft component interface 204 (and/or the shared data processor 301 when such is present), with or without temporary buffering of that data as may be appropriate to a given application setting. In a similar manner, such logic can be configured to receive data from its aircraft component and to parse, arrange, aggregate, concatenate, and/or otherwise prepare such data for transmission in a manner that is compatible with the aforementioned data handling protocol. This can also include, as appropriate, adding additional information to such a data packet including such items as a source identifier, a destination identifier, a time stamp, and so forth.

As mentioned above, by one approach these constituent components of each data bus interface 201A-201C are designed and manufactured independently of one another. As a result, for example, the optical bus interfaces of the first data bus interface 201A are different from the optical bus interfaces of the second or third data bus interfaces 201B and 201C. As another example, the logic unit as comprises a part of each of the three data bus interfaces 201A-201C are also each different from the other two.

It is also possible that the means of coupling these components together will vary from interface to interface as well. As but one illustration in this regard, the first data bus interface 201A may employ a particular lightpipe material and design to couple the optical bus interfaces 401 to the logic unit 402 while the second data bus interface 201B may instead provide for converting the optical data as is received via an optical bus interface 401 into an electrical corollary that is then provided to the logic unit 402 via a corresponding electrical conductor.

Figure 5:
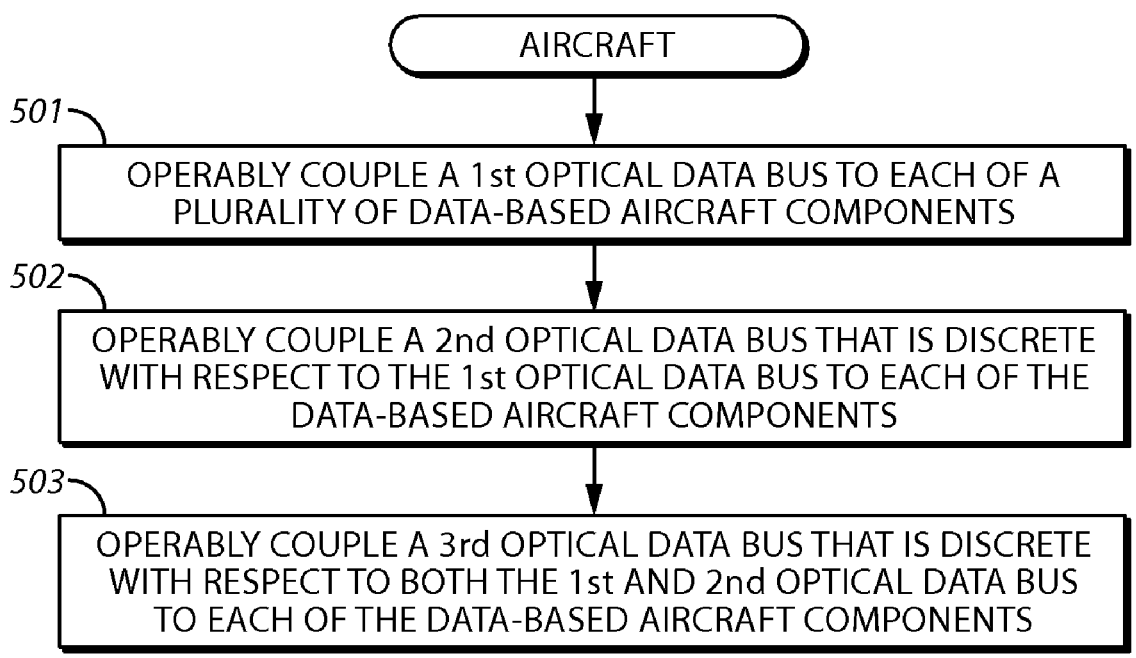
FIG. 5 comprises a flow diagram as configured in accordance with various embodiments of the invention.

As noted above, these teachings will accommodate the use of data busses that comprise a plurality of independent optical data busses. To provide further examples in that regard, and referring now to FIG. 5, these teachings will accommodate (in, for example, an aircraft) operably coupling 501 a first optical data bus to each of a plurality of data-based aircraft components, operably coupling 502 a second optical data bus to each of those same data-based aircraft components, and again operably coupling 503 a third optical data bus to each of those same data-based aircraft components. By one approach, each of these optical data busses is independent and discrete of the others. If desired, these teachings would readily accommodate providing additional optical data busses that are similarly coupled. In general, however, three such optical data busses should be sufficient for most if not all application purposes.

Figure 6:
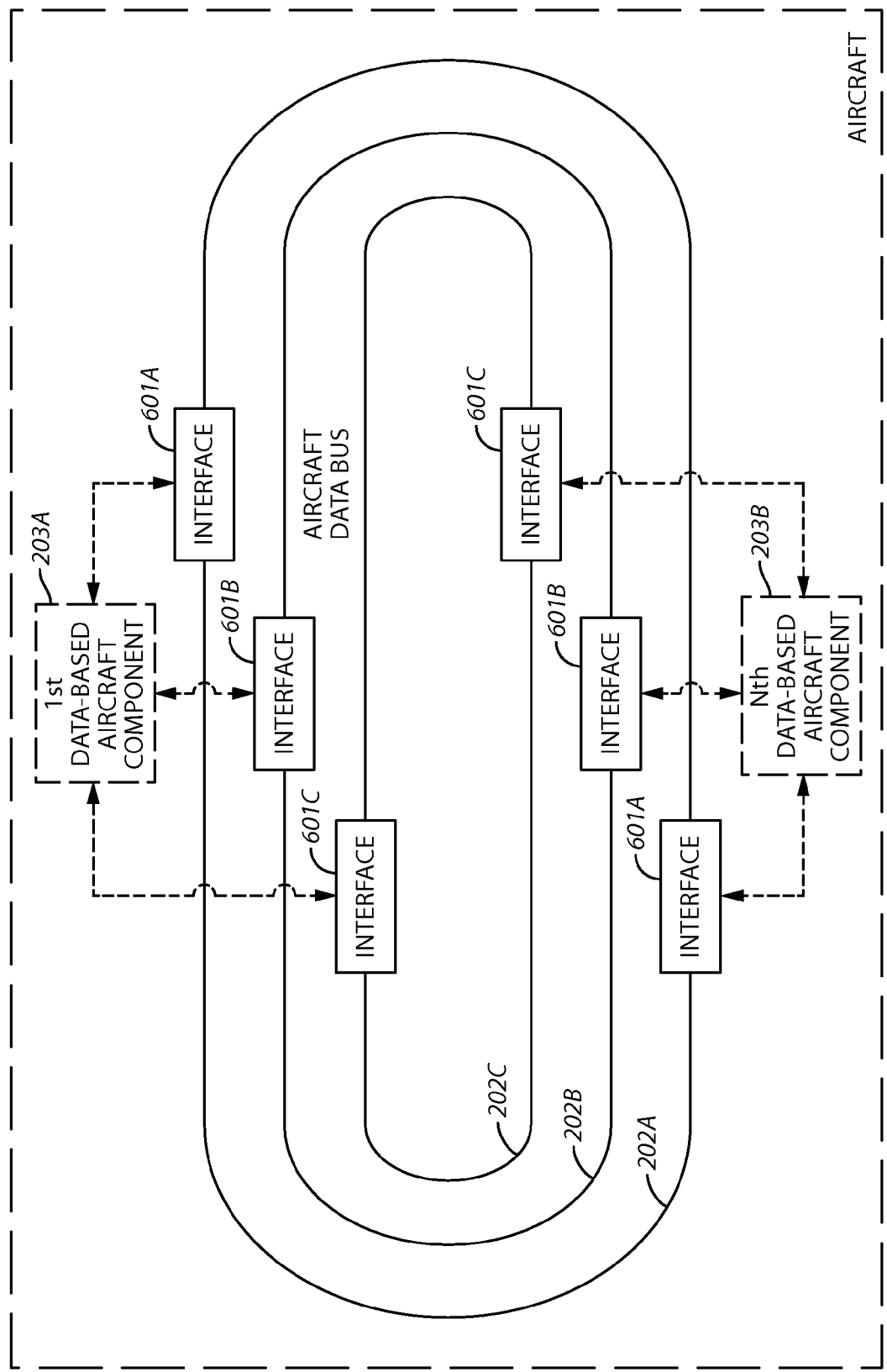
FIG. 6 comprises a block diagram as configured in accordance with various embodiments of the invention.

FIG. 6 presents an illustrative example in this regard. In this illustrative example, each of the optical data busses 202A-202C comprises a full-duplex optical data bus made of one or more plastic optical fibers (and/or a polymer optical film waveguide) that employs a common data handling protocol (i.e., a same data handling protocol). By one approach, as noted earlier above, this data handling protocol can comprise a relatively simple protocol that eschews, for example, making provision for any error correcting capability or functionality. In the embodiment shown, each such optical data bus 202A-202C also comprises a separate ring-configured optical data bus.

Each of these optical data busses 202A-202C operably couples (via, for example, interfaces 601A-601C such as, but not limited to, those described above) to each of a plurality of data-based aircraft components (represented here by a first data-based aircraft component 203A through an Nth data-based aircraft component 203B where "N" shall be understood to refer to an integer value greater than one). So configured, as will be well understood by those skilled in the art, any given such data-based aircraft component can transmit data via each of three separately designed and manufactured data bus interfaces and via each of three separate and discrete data busses to another data-based aircraft component.

Notwithstanding that the data-handling protocol employed by each of the data busses may be utterly bereft of any native error correction capability or support, these measures are viewed as being sufficient to virtually guarantee reliable conveyance and receipt of such information even in the absence of such measures. Though a given event or condition may impair or prohibit a given one of the interfaces from properly effecting these tasks, it is highly unlikely that all three of the interfaces for any given one of the data-based aircraft components will be similarly impaired in response to the same failure mode.

Similarly, though some event or condition may break or otherwise disrupt a given one of the data busses, it is unlikely that all three of the data busses will be similarly disrupted at the same time (presuming, of course, that alternative routing techniques are employed for each such data bus). Furthermore, even if a given event did succeed in breaching all three data busses, the bi-directional functionality and capability of each of the data busses continues to ensure that data will continue to reach its intended destination. So configured, all three data busses must be breached or broken on both sides of a given aircraft component in order to successfully isolate that aircraft component from the data-bearing infrastructure of the aircraft. So long as even only one of the data busses survives intact, that aircraft component may continue to remain operationally effective.

Figure 7:
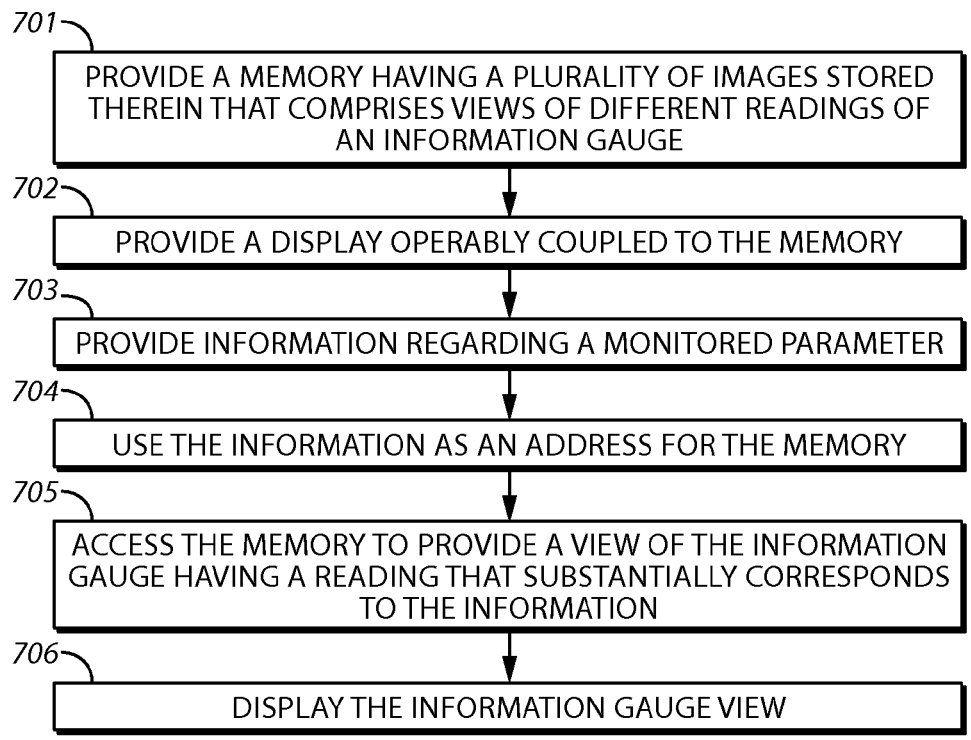
FIG. 7 comprises a flow diagram as configured in accordance with various embodiments of the invention.

Referring now to FIG. 7, yet other approaches towards dealing with the previously mentioned challenges will be presented. In particular, FIG. 7 presents an illustrative example of ways by which certain data-based aircraft components, and particularly information gauge displays, can have reduced (or effectively eliminated) software content, copper-based data pipelines, and so forth.

Figure 8:
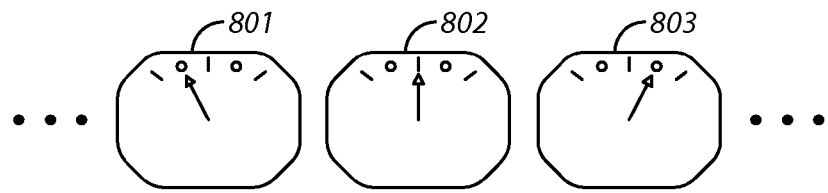
FIG. 8 comprises a schematic diagrammatic view as configured in accordance with various embodiments of the invention.

By this approach, one provides 701 a memory having a plurality of images stored therein. This plurality of images comprises a view of at least one information gauge at a variety of different readings. To illustrate, and now making momentary reference to FIG. 8, this can comprise a plurality of views 801-803 of a given information gauge where the views differ from one another with respect to the gauge reading. By one approach, essentially all practically possible gauge readings are represented in this manner. Accordingly, by this approach, the memory contains a view of the information gauge at each reading as corresponds to a given range of readings and a desired degree of precision.

These teachings are readily applied with any of a wide variety of image types. By one approach, these images can comprise photographic images of the corresponding information gauge at the different readings. By another approach, these images can comprise virtual renderings of the information gauge at the variety of different readings. By yet another approach, these images can comprise a composite of both real and virtual images (for example, the gauge representation itself can comprise a photographic image while the value indicator comprises a virtual element).

Figure 9:
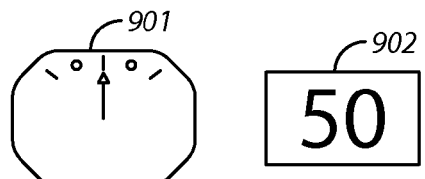
FIG. 9 comprises a schematic diagrammatic view as configured in accordance with various embodiments of the invention.

It would of course be possible for this memory to contain a set of images for more than one information gauge. By one approach this might comprise information gauges for differing types of information. By another approach this might comprise information gauges for a same type of information. By way of illustration, and referring now momentarily to FIG. 9, this can comprise providing a first set of information gauge images as correspond to what appears to be an analog information gauge 901 and a second set of information gauges as correspond to what appears to be a digital information gauge, where both information gauges relate information regarding a same metric, data value, or operational parameter.

Those skilled in the art will recognize and understand that, as used herein, the expression "information gauge" encompasses a wide variety of information-imparting contrivances. These include, but are not limited to, both analog and digital gauges of various traditional kinds as well as presently less common examples such as heads-up displays or other composite presentations where the gauge information is presented in combination with other information (such as an actual or virtual view of a forward view out the cockpit windows). The information conveyed can also vary in form and substance in various ways. For example, the information conveyed can comprise a simple numerical value. As another example, however, the information conveyed can instead comprise a non-numeric indication (corresponding, for example, to a textual or iconic representation of such things as a sense of "full" or "empty," "safe" or "dangerous," or "normal" or "abnormal," to note but a few examples in this regard). It is also possible for such information to comprise yet other kinds of data such as, for example, a virtual representation of the location of a landing strip that is overlaid on an actual view of the corresponding terrain.

Those skilled in the art will appreciate that the above-described memory is readily enabled using any of a wide variety of available and/or readily configured storage platforms of various type, capacity, volatility, and so forth. It will also be understood that the reference to a "memory" may comprise a reference to a single storage platform or to a plurality of storage platforms as may be available when using a distributed storage architecture.

Referring again to FIG. 7, this process then also provides 702 a display that is operably coupled to this memory. In an aircraft, such a display is likely to be provided in the aircraft cockpit to enable its use by relevant flight personnel. The display itself can comprise any of a wide variety of displays that are presently known or that are hereafter developed, provided that display is capable of presenting a rendering of the aforementioned information gauge images as per these teachings. Some examples would include, but are not limited to, tube-based displays, flat panel displays, and heads-up displays of various kinds. The display may be true color, multi-chromatic, or monochromatic as desired. As these teachings are relatively insensitive to the selection of any particular choice in this regard, for the sake of brevity further elaboration in this regard will not be presented here.

Pursuant to these teachings, upon being provided 703 with information regarding a given monitored parameter (such as, for example, a monitored avionics parameter such as airspeed), this information is used 704 as an address for the aforementioned memory. That is, the value of the parameter of interest is itself correlated to the address of the information gauge view that itself corresponds to that parameter value. By one approach, when the memory addressing scheme permits, this can comprise a literal one-for-one correlation. In other instances where the memory addressing scheme is incompatible for whatever reason with such an approach, a simple look-up table corollary can be used to correlate the parameter value with the corresponding information gauge image.

Having established the memory address using the received parameter value information, one then accesses 705 the memory to thereby retrieve and provide a view of the information gauge having a reading that substantially corresponds to this information. The aforementioned display can then display 706 this particular information gauge view to thereby provide the information regarding the monitored parameter to a viewer.

By one approach, the aforementioned information regarding a monitored parameter is received on a relatively frequent basis in what amounts to substantially real time. So configured, the aforementioned steps regarding use of the information to specify a particular memory address followed by accessing the memory to retrieve and display the corresponding information gauge view can be repeated on a relatively regular basis (thereby achieving, for example, a 60 Hz refresh rate). So configured, a highly compelling and realistic presentation of an information gauge that smoothly tracks, in substantial real time, the parameter of interest can be achieved.

Figure 10:
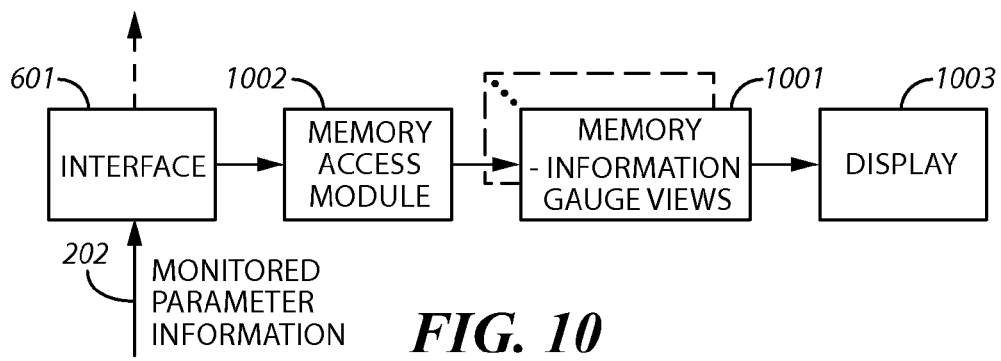
FIG. 10 comprises a block diagram as configured in accordance with various embodiments of the invention.

By way of further illustration, and referring now to FIG. 10, an interface 601 (such as, for example, an aircraft data bus interface as has been described above) can couple to a data bus 202 to thereby receive monitored parameter information of interest. This can comprise, as noted, essentially real-time information regarding a presently monitored parameter such as a monitored avionics parameter of interest. This interface 601 couples to a memory access module 1002 that in turn couples to the aforementioned memory 1001 (or memories as the case may be) that contains the aforementioned information gauge views. This memory access module 1002 is configured and arranged to facilitate the steps described above. This can comprise, in particular, receiving the monitored parameter information, using that information as an address for the memory, and accessing the memory using that address to provide a view of the information having a reading that substantially corresponds to the information to a corresponding display 1003.

Consistent with these teachings, if desired, this memory access module 1002 (like the interface 601 itself) can comprise a softwareless component. This can again be realized using hard-wired logic as necessary to achieve the described functionality.

Figure 11:
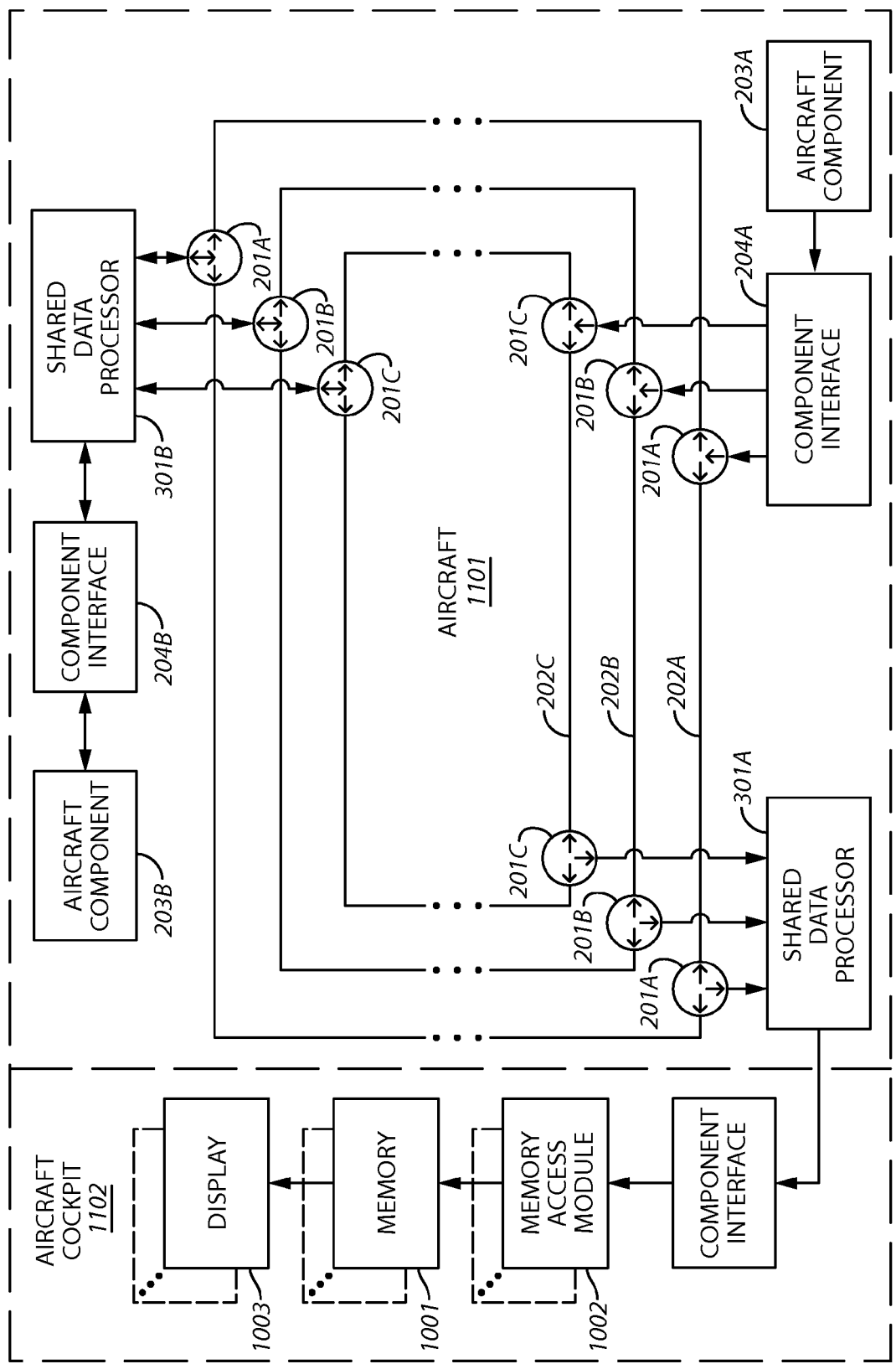
FIG. 11 comprises a block diagram as configured in accordance with various embodiments of the invention.

These various teachings can be individually applied with significant benefits being attained. In the aggregate, however, the results appear even more dramatic. To illustrate, and referring now to FIG. 11, a given aircraft 1101 can have a data bus architecture as described above that comprises three separate and discrete optical data busses 202A-202C that are each configured as a ring and that each accommodate bi-directional data transmissions using a shared data handling protocol that lacks native error correction functionality and capability. A plurality of data base interfaces 201A-201C are then used to connect each of these separate optical data busses 202A-202C to each of a plurality of aircraft components, including aircraft components 203A that source data, aircraft components 203B that both source and receive data, and aircraft components that receive data (such as the aircraft components depicted in FIG. 11 that reside within the aircraft cockpit 1102).

In this illustrative embodiment, the aircraft components that receive data are shown as further being deployed in conjunction with the aforementioned shared data processors 301A-301B to facilitate the aggregated processing and use of the incoming redundant data streams prior to passing a corresponding representative parameter value to the corresponding aircraft component. This illustrative embodiment also depicts one of the aircraft components as comprising, in the aggregate, a memory access module 1002, an information gauge views-containing memory 1001, and display 1003 as described above.

So configured, for example, monitored parameter information as sourced by a first aircraft component 203A is transmitted via each of the separate optical data busses 202A-202C using, with each such data bus, a separately designed and manufactured data bus interface 201A-201C. This information can be received and evaluated by a given shared data processor 301A to provide a corresponding representative value that is based on the value received via each of the three data busses 202A-202C to the memory access module 1002. The latter then uses that representative value to address the memory 1001 and thereby cause provision of a particular information gauge view to be displayed on the cockpit display 1003.

The extensive substitution of optical fiber for copper conductors in such a deployment can lead to large weight savings for the resultant aircraft. The design and makeup of the data-bearing infrastructure is seen to provide for a level of robustness and reliability that should readily support dispensing with error correcting data handling protocols. This, in turn, permits considerably simplified logic and data handling functionality which then leads to a genuine opportunity to field data-handling platforms that are devoid of software. This lack of software requirements can then lead to enormous savings with respect to the cost of developing, testing, debugging, and deploying such a system as compared to traditional practice in this regard.

These benefits extend directly into the cockpit of the aircraft where fully virtual information gauges are offered in a manner that again eschews the need for much overhead software. In fact, taken as an aggregation of practices, these teachings provide for a data-bearing transport system of such high reliability (based upon this combination of redundancies, simplicity, minimized common mode failure opportunities, and software avoidance) that it should now be possible to design, build, and deploy aircraft as shown that lack any mechanical gauges whatsoever, including the standby mechanical gauges that are presently required using traditional practices.

Taken as a whole or individually, these teachings provide a significant opportunity to reduce the weight required by such systems, to improve the reliability by which data is transported from one place to another, and to greatly reduce the costs and time requirements of designing an aircraft that makes use of these teachings.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
providing a memory having a plurality of images stored therein, wherein the plurality of images comprise a view of an information gauge at a variety of different readings;
providing a display that is operably coupled to the memory;
providing information regarding a monitored parameter;
using the information as an address for the memory;
accessing the memory using the address to provide a view of the information gauge having a reading that substantially corresponds to the information;
displaying the view of the information gauge having a reading that substantially corresponds to the information to thereby provide the information regarding the monitored parameter to a viewer.

2. The method of claim 1 wherein providing a memory having a plurality of images stored therein, wherein the plurality of images comprise a view of an information gauge at a variety of different readings further comprises providing a memory having a plurality of images stored therein, wherein the plurality of images comprise a view of an information gauge at a variety of different readings such that there is a view of the information gauge at each reading as corresponds to a given range of readings and a desired degree of precision.

3. The method of claim 1 wherein providing a memory having a plurality of images stored therein, wherein the plurality of images comprise a view of an information gauge at a variety of different readings comprises providing photographic images of the information gauge at the different readings.

4. The method of claim 1 wherein providing a memory having a plurality of images stored therein, wherein the plurality of images comprise a view of an information gauge at a variety of different readings comprises providing virtual renderings of the information gauge at the variety of different readings.

5. The method of claim 1 wherein providing a memory having a plurality of images stored therein, wherein the plurality of images comprise a view of an information gauge at a variety of different readings comprises providing a memory having a plurality of images stored therein, wherein the plurality of images comprise:
a view of a first information gauge at a variety of different readings;
a view of at least a second information gauge at a variety of different readings, wherein the second information gauge is different from the first information gauge.

6. The method of claim 5 wherein the second information gauge is different from the first information gauge with respect to at least one of:
a type of information gauge;
a type of monitored parameter for which the information gauge provides readings.

7. The method of claim 1 wherein using the information as an address for the memory, accessing the memory using the address to provide a view of the information gauge having a reading that substantially corresponds to the information, and displaying the view of the information gauge having a reading that substantially corresponds to the information is repeated on a relatively frequent basis.

8. The method of claim 7 wherein using the information as an address for the memory, accessing the memory using the address to provide a view of the information gauge having a reading that substantially corresponds to the information, and displaying the view of the information gauge having a reading that substantially corresponds to the information is repeated on a relatively regular basis.

9. The method of claim 8 wherein using the information as an address for the memory, accessing the memory using the address to provide a view of the information gauge having a reading that substantially corresponds to the information, and displaying the view of the information gauge having a reading that substantially corresponds to the information is repeated using a 60 Hz refresh rate.

10. The method of claim 1 wherein using the information as an address for the memory, accessing the memory using the address to provide a view of the information gauge having a reading that substantially corresponds to the information, and displaying the view of the information gauge are each accomplished without software.

11. The method of claim 1 wherein all of the steps are conducted in an aircraft.

12. The method of claim 11 wherein providing information regarding a monitored parameter comprises providing information regarding a monitored avionics parameter.

13. The method of claim 1 wherein providing information regarding a monitored parameter comprises providing substantially real-time information regarding a presently monitored parameter.

14. The method of claim 13 wherein using the information as an address for the memory, accessing the memory using the address to provide a view of the information gauge having a reading that substantially corresponds to the information, and displaying the view of the information gauge having a reading that substantially corresponds to the information is done substantially in real time.

15. An apparatus comprising:
a memory having a plurality of images stored therein, wherein the plurality of images comprise a view of an information gauge at a variety of different readings;
a display that is operably coupled to the memory;
an interface configured and arranged to receive information regarding a monitored parameter;
a memory access module that is operably coupled to the memory and the interface and that is configured and arranged to:
use the information as an address for the memory;
access the memory using the address to provide a view of the information gauge having a reading that substantially corresponds to the information to the display;
such that the display displays the view of the information gauge having a reading that substantially corresponds to the information to thereby provide the information regarding the monitored parameter to a viewer.

16. The apparatus of claim 15 wherein the plurality of images comprise a view of an information gauge at a variety of different readings such that there is a view of the information gauge at each reading as corresponds to a given range of readings and a desired degree of precision.

17. The apparatus of claim 15 wherein the plurality of images comprise a view of an information gauge at a variety of different readings comprises providing photographic images of the information gauge at the different readings.

18. The apparatus of claim 15 wherein the plurality of images comprise a view of an information gauge at a variety of different readings comprises providing virtual renderings of the information gauge at the variety of different readings.

19. The apparatus of claim 15 wherein the plurality of images comprise:
a view of a first information gauge at a variety of different readings;
a view of at least a second information gauge at a variety of different readings, wherein the second information gauge is different from the first information gauge.

20. The apparatus of claim 19 wherein the second information gauge is different from the first information gauge with respect to at least one of:
a type of information gauge;
a type of monitored parameter for which the information gauge provides readings.

21. The apparatus of claim 15 wherein the memory access module is further configured and arranged to repeat using the information as an address for the memory and to access the memory using the address to provide a view of the information gauge having a reading that substantially corresponds to the information to the display on a relatively frequent basis.

22. The apparatus of claim 21 wherein the memory access module is further configured and arranged to repeat using the information as an address for the memory and to access the memory using the address to provide a view of the information gauge having a reading that substantially corresponds to the information to the display on a relatively regular basis.

23. The apparatus of claim 22 the memory access module is further configured and arranged to repeat using the information as an address for the memory and to access the memory using the address to provide a view of the information gauge having a reading that substantially corresponds to the information to the display using a 60 Hz refresh rate.

24. The apparatus of claim 15 wherein neither the interface or the memory access module contain software.

25. The apparatus of claim 15 wherein the information regarding a monitored parameter comprises substantially real-time information regarding a presently monitored parameter.

26. The apparatus of claim 15 wherein the information regarding a monitored parameter comprises information regarding a monitored avionics parameter.

27. An aircraft comprising:
a cockpit having a display;
a memory operably coupled to the display and having a plurality of images stored therein, wherein the plurality of images comprise a view of an avionics gauge at a variety of different readings;
an interface configured and arranged to receive information regarding a monitored avionics parameter;
a memory access module that is operably coupled to the memory and the interface and that is configured and arranged to:
use the information as an address for the memory;
access the memory using the address to provide a view of the avionics gauge having a reading that substantially corresponds to the information to the display;
such that the display displays the view of the avionics gauge having a reading that substantially corresponds to the information to thereby provide the information regarding the monitored parameter to a viewer in the cockpit.

28. The aircraft of claim 27 wherein the memory has stored therein images comprising a view of every presentable avionics gauge for the aircraft, such that the aircraft has no mechanical gauges.

* * * * *

UNITED STATES PATENT AND TRADEMARK OFFICE
CERTIFICATE OF CORRECTION

PATENT NO. : 7,482,950 B2 Page 1 of 1
APPLICATION NO. : 11/464321
DATED : January 27, 2009
INVENTOR(S) : Stoner et al.

It is certified that error appears in the above-identified patent and that said Letters Patent is hereby corrected as shown below:

ON TITLE PAGE:

Item (57) in the Abstract section, Line 8, delete "use a" and insert --use of a--.

Claim 24, Column 14, Line 35, delete "or" and insert --nor--.

Signed and Sealed this

Twelfth Day of May, 2009

JOHN DOLL
*Acting Director of the United States Patent and Trademark Office*